US009467775B2

(12) United States Patent
Olsson

(10) Patent No.: US 9,467,775 B2
(45) Date of Patent: Oct. 11, 2016

(54) METHOD AND A SYSTEM FOR NOISE SUPPRESSING AN AUDIO SIGNAL

(75) Inventor: Rasmus Kongsgaard Olsson, Roskilde (DK)

(73) Assignee: GN Netcom A/S (DK)

( * ) Notice: Subject to any disclaimer, the term of this patent is extended or adjusted under 35 U.S.C. 154(b) by 106 days.

(21) Appl. No.: 14/241,326

(22) PCT Filed: Aug. 31, 2012

(86) PCT No.: PCT/EP2012/066971
§ 371 (c)(1),
(2), (4) Date: Jun. 18, 2014

(87) PCT Pub. No.: WO2013/030345
PCT Pub. Date: Mar. 7, 2013

(65) Prior Publication Data

US 2014/0307886 A1 Oct. 16, 2014

(30) Foreign Application Priority Data

Sep. 2, 2011 (DK) ................................ 2011 00667

(51) Int. Cl.
*H04B 15/00* (2006.01)
*H04R 3/00* (2006.01)
(Continued)

(52) U.S. Cl.
CPC ........... *H04R 3/002* (2013.01); *G10L 21/0232* (2013.01); *G10L 2021/02165* (2013.01); *G10L 2021/02166* (2013.01)

(58) Field of Classification Search
CPC . H04R 25/552; G10L 21/02; G10L 21/0208; G10L 21/0216; G10L 2021/02161; G10L 2021/02165; G10L 2021/02166; G10L 21/0264
See application file for complete search history.

(56) References Cited

U.S. PATENT DOCUMENTS 6,584,203 B2 * 6/2003 Elko ...................... H04R 1/406 381/26
2007/0154031 A1 * 7/2007 Avendano ........... G10L 21/0208 381/92

(Continued)

FOREIGN PATENT DOCUMENTS

WO WO03/015458 2/2003
WO WO2009/076523 6/2009
WO WO2009/096958 8/2009

OTHER PUBLICATIONS

Wittkop T. et al.: "Strategy-selective noise reduction for binaural digital hearing aids", Speech Communication, Elsevier Science Publishers, Amsterdam, NL, vol. 39, Jan. 1, 2003, pp. 111-138, XP002266432, ISSN: 0167-6393.

(Continued)

*Primary Examiner* — Duc Nguyen
*Assistant Examiner* — Kile Blair
(74) *Attorney, Agent, or Firm* — Altera Law Group, LLC

(57) ABSTRACT

A method and a system of noise suppressing an audio signal comprising a combination of at least two audio system input signals each having a sound source signal portion and a background noise portion, the method and system comprising steps and means of: Extracting at least two different types of spatial sound field features from the input signals such as discriminative speech and/or background noise features, computing a first intermediate spatial noise suppression gain on the basis of the extracted spatial sound field features, computing a second intermediate stationary noise suppression gain, combining the two intermediate noise suppression gains to form a total noise suppression gain, wherein the two intermediate noise suppression gains are combined by comparing their values and dependent on their ratio or relative difference, determining the total noise suppression gain, applying the total noise suppression gain to the audio signal to generate a noise suppressed audio system output signal.

17 Claims, 3 Drawing Sheets

(51) Int. Cl.
*G10L 21/0232* (2013.01)
*G10L 21/0216* (2013.01)

(56) References Cited

U.S. PATENT DOCUMENTS

| | | | | |
|---|---|---|---|---|
| 2007/0237341 | A1* | 10/2007 | Laroche | H04M 1/6033 381/94.3 |
| 2011/0070926 | A1 | 3/2011 | Vitte et al. | |

OTHER PUBLICATIONS

Seon Man Kim et al.: "Probabilistic spectral gain modification applied to beamformer-based noise reduction in a car environment", IEEE Transactions on Consumer Electronics, IEEE Service Center, New York, NY, US, vol. 57, No. 2, May 1, 2011, pp. 866-872, XP011335726, ISSN: 0098-3063.

Homayoun Kamkar-Parsi A et al.: "Instantaneous Binaural Target PSD Estimation for Hearing Aid Noise Reduction in Complex Acoustic Environments", IEEE Transactions on Instrumentation and Measurement, IEEE Service Center, Piscataway, NJ, US, vol. 60, No. 4, Apr. 1, 2011, pp. 1141-1154, XP011349547, ISSN: 0018-9456.

Danish search Report for Danish Application PA 2011 00667 dated Apr. 16, 2012.

International Search Report for PCT Application No. PCT/EP2012/066971 dated Apr. 10, 2013.

* cited by examiner

METHOD AND A SYSTEM FOR NOISE SUPPRESSING AN AUDIO SIGNAL

The present invention relates to devices, systems and methods for noise suppressing audio signals comprising a combination of at least two audio system input signals each having a source signal portion and a background noise portion.

BACKGROUND OF THE INVENTION

In audio communication, it is typically expedient to transmit a user's voice undistorted and free of noise. However, communication devices are often employed in noisy environments; the signals picked up by a device's microphones are mixtures of the user's voice and interfering noise.

The characteristics of the sound field at the microphones vary substantially across different signal and noise scenarios. For instance, the sound may come from a single direction or from many directions simultaneously. It may originate far away from—or close to the microphones. It may be stationary/constant or non-stationary/transient. The noise may also be generated by wind turbulence at the microphone ports.

Multi-microphone background noise reduction methods fall in two general categories. The first type is beamforming, where the output samples are computed as a linear combination of the input samples. The second type is noise suppression, where the noise component is reduced by applying a time-variant filter to the signal, such as by multiplying a time and frequency dependant gain on the signal in a filter bank domain.

When only one microphone or audio input is available, a noise suppression filter cannot be spatially sensitive. There is no access to the spatial features of the sound field, providing discriminative information about speech and background noise, and is typically limited only to suppress the stationary or quasi-stationary component of the background noise.

Beamforming and noise suppression may be sequentially applied, since their noise reduction effects are additive.

An example of an adaptive beamformer is disclosed in WO 2009/132646 A1.

A method of separating mixtures of sound is disclosed in "O. Yilmaz and S. Rickard, Blind Separation of Speech Mixtures via Time-Frequency Masking, IEEE Transactions on Signal Processing, Vol. 52, No. 7, pages 1830-1847, July 2004". Separation masks are computed in a time-frequency representation on the basis of two features, namely the level difference and phase-delay between the two sensor signals.

A method of combining directional noise suppression and a stationary noise suppression algorithm is disclosed in WO 2009/096958 A1. However, this method does not take into account a spatial noise suppression component which takes advantage of combining a set of spatially discriminative features besides directional features.

SUMMARY OF THE INVENTION

The fundamental problem of noise suppression addressed by this invention is to classify a sound signal across time and frequency as being either predominantly a signal of interest, e.g. a user's voice or speech, or predominantly interfering noise and to apply the relevant filtering to reduce the noise component in the output signal. This classification has a chance of success when the distributions of speech and noise are differing.

Exploiting the differing distributions, a number of methods in the literature propose spatial features that map the signals to a one-dimensional classification problem to be subsequently solved. Examples of such features are angle of arrival, proximity, coherence and sum-difference ratio.

The present invention exploits the fact that each of the proposed spatial features are attached with a degree of uncertainty and that they may advantageously be combined, achieving a higher degree of classification accuracy that could otherwise have been achieved with any one of the individual spatial features. The proposed spatial features have been selected so that each of them adds discrimination power to the classifier.

In one embodiment of the invention the input to the classifier is a weighted sum of the proposed features.

An object of the present invention is therefore to provide a noise suppressor in the transmit path of a personal communication device which eliminates stationary noise as well as non-stationary background noise.

According to a first aspect of the invention this is achieved by a method of noise suppressing an audio signal comprising a combination of at least two audio system input signals each having a sound source signal portion and a background noise portion, the method comprising steps of:

a) extracting at least two different types of spatial sound field features from the input signals such as discriminative speech and/or background noise features, b) computing a first intermediate spatial noise suppression gain on the basis of the extracted spatial sound field features, c) computing a second intermediate stationary noise suppression gain, d) combining the two intermediate noise suppression gains to form a total noise suppression gain, wherein the two intermediate noise suppression gains are combined by comparing their values and dependent on their ratio or relative difference, determining the total noise suppression gain, e) applying the total noise suppression gain to the audio signal to generate a noise suppressed audio system output signal.

The method may advantageously be carried out in the frequency domain for at least one frequency sub-band. Well known methods of Fourier transformation such as the Fast Fourier Transformation (FFT) may be applied to convert the signals from time domain to frequency domain. As a result, optimal filtering may be applied in each band. A new frequency spectrum may be calculated every 20 ms or at any other suitable time interval using the FFT algorithm.

To achieve the optimum noise suppression gain in step d) mentioned above, the total noise suppression gain may be selected as the minimum gain or the maximum gain of the two intermediate noise suppression gains. If aggressive noise suppression is desired, the minimum gain could be selected. If conservative noise suppression is desired, letting through a larger amount of speech, the maximum gain could be selected.

Within the span of the minimum and the maximum gain a weighing factor may also be applied in step d) to achieve a more flexible total noise suppression gain. The total noise suppression gain is then selected as a linear combination of the two intermediate noise suppression gains. If the same factor 0.5 is applied to the two intermediate gains the result will be the average gain. Other factors such as 0.3 for the first intermediate gain and 0.7 for the second or vice-versa may be applied. The selected combination may be based on a measure of confidence provided by each noise reduction method.

In an embodiment of the invention, the spatial sound field features may comprise sound source proximity and/or sound signal coherence and/or sound wave directionality, such as angle of incidence.

The method may further comprise prior to step e), a step of spatially filtering the audio signal by means of a beamformer, and subsequently in step e) applying the total noise suppression gain to the output signal from the beamformer. In this way the audio signal will already to some extend have been spatially filtered before applying the total noise suppression gain.

The method may further comprise a step of computing at least one set of spatially discriminative cues derived from the extracted spatial features, and computing the spatial noise suppression gain on basis of the set(s) of spatially discriminative cues. Computing the spatial noise suppression gain may be done from a linear combination of spatial cues. Preferably the method comprises weighing the mutual relation of the content of the different types of spatial cues in the set of spatial cues as a function of time and/or frequency. In this way e.g. the directionality cue may be chosen to be more predominant in one frequency sub-band and the proximity cue to be more predominant in another frequency sub-band. New spatial cues may be computed every 20 ms or at any other suitable time interval.

In an embodiment the method comprises computing the stationary noise suppression gain on basis of a beamformer output signal. This enables the stationary noise suppression filter to calculate an improved estimate of the background noise and desired sound source portions (voice/speech) of the audio system signal.

The audio system input signals may comprise at least two microphone signals to be processed by the method.

A second aspect of the present invention relates to a system for noise suppressing an audio signal, the audio signal comprising a combination of at least two audio system input signals each having a sound source signal portion and a background noise portion, wherein the system comprises:

a spatial noise suppression gain block for computing a first intermediate spatial noise suppression gain, the spatial noise suppression gain block comprising spatial feature extraction means for extracting at least two different types of spatial sound field features from the input signals, and computing means for computing the spatial noise suppression gain on the basis of extracted spatial sound field features, such as discriminative speech and/or background noise features, a stationary noise suppression gain block for computing a second intermediate stationary noise suppression gain, a noise suppression gain combining block for combining the two intermediate noise suppression gains by comparing their values and dependent on their ratio or relative difference, determining the total noise suppression gain, an output filtering block for applying the total noise suppression gain to the audio signal to generate a noise suppressed audio system output signal.

The spatial sound field features may further comprise the same features as mentioned above according to the first aspect of the invention. Likewise the total noise suppression gain may be determined and selected in the same way as explained in accordance with the first aspect of the invention.

The system may further comprise an audio beamformer having the two audio system input signals as input and a spatially filtered audio signal as output, the output signal serving as input signal to the output filtering block.

The features of the second aspect of the invention provide at least the same advantages as explained in accordance with the first aspect of the invention.

A third aspect of the invention relates to a headset comprising at least two microphones, a loudspeaker and a noise suppression system according to the second aspect of the invention, wherein the microphone signals serves as input signals to the noise suppression system.

BRIEF DESCRIPTION OF THE DRAWINGS

Preferred embodiments of the invention will be described in more detail in connection with the appended drawings, in which.

DESCRIPTION OF PREFERRED EMBODIMENTS

Figure 1:
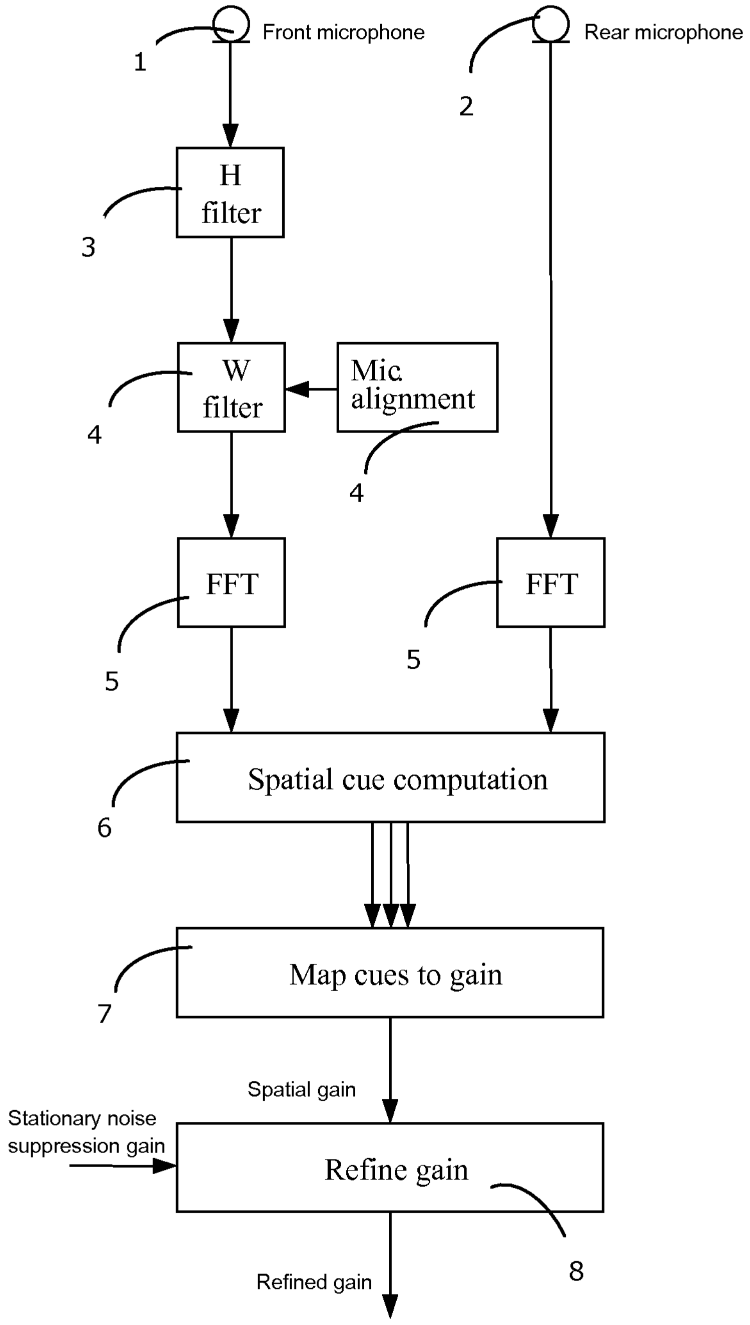
FIG. 1) depicts a first embodiment of a system for noise suppressing an audio signal according to the invention.

In FIG. 1 is shown an illustration of a system for noise suppressing an audio signal according to an embodiment of the invention. The system and an example of carrying out a method of noise suppressing an audio signal according to the invention will be described in details below.

The system processes inputs from at least two audio channels such as the input from two audio microphones placed in a sound field comprising a desired sound source signal such as speech from the mouth of a user of a personal communication device and an undesired background noise e.g. stationary or non-stationary background noise. A typical device for personal communication using the system for noise suppressing may be a headset such as a telephone headset placed on or near the ear of the user. Applying a noise suppression algorithm on the transmitted audio signal in the headset improves the perceived quality of the audio signal received at a far end user during a telephone conversation.

Sound field information is exploited in order to discriminate between user speech and background noise and spatial features such as directionality, proximity and coherence are exploited to suppress sound not originating from the user's mouth.

The microphones typically have different distances to the desired sound source in order to provide signals having different signal to noise ratios making further processing possible in order to efficiently remove the background noise portion of the signal.

In FIG. 1, the microphone 1 closest to the mouth of the user is called the front microphone and the microphone 2 further away from the user's mouth is called the rear microphone. The microphones are adapted for collecting sound and converting the collected sound into an analogue electrical signal. However, to provide a digital output signal for further processing, the microphones may be digital or the audio system may have an input circuitry comprising A/D-converters (not shown). The first audio signal is fed to a first processing means 3, comprising a filter (H-filter), for phase—and amplitude alignment of the sound source of interest, e.g. speech from the headset user's mouth, thereby compensating for the difference in distance between the sound source and microphone 1 and the sound source and microphone 2. A second processing means (W-filter) 4 comprises a microphone matching filter which is applied to the output from the spatial matching filter to compensate for any inherent variation in microphone and input circuitry amplitude and phase sensitivity between the two microphones. A time delay (not shown) may be applied to the signal from the rear microphone 2 to time align the two microphone signals.

The aligned input signals are advantageously Fourier transformed by a well known method such as the Fast Fourier Transformation (FFT) 5 to convert the signals from time domain to frequency domain. This enables signal processing in individual frequency sub-bands which ensures an efficient noise reduction as the signal to noise ratio may vary substantially from sub-band to sub-band. The FFT algorithm 5 may alternatively be applied prior to the alignment and matching filters 3, 4.

The spatial noise suppression gain block 6, 7 for computing a first intermediate spatial noise suppression gain comprises spatial feature extraction means and computing means for computing the spatial noise suppression gain on the basis of the extracted spatial sound field features. The features may be discriminative speech and/or background noise features, such as sound source proximity, sound signal coherence and sound wave directionality. One or more of the different types may be extracted. The proximity features carries information on the distance from the sound source to the signal sensing unit such as two microphones placed in a headset. The user's mouth will be located at a fairly well defined distance from the microphones making it possible to discriminate between speech and noise from the surroundings.

The coherence feature carries information about the similarity of the signals sensed by the microphones. A speech signal from the user's mouth will result in two highly coherent sound source portions in the two input signals, whereas a noise signal will result in a less coherent signal. The directionality feature carries information such as the angle of arrival of an incoming sound wave on the surface of the microphone membranes. The user's mouth will typically be located at a fairly well defined angle of arrival relative to the noise sources. On the basis of these spatial features, the spatial cues are computed and in the further processing, mapped to the spatial gain.

A stationary noise suppression gain is computed, typically using a well known single channel stationary noise suppression method such as a Wiener filter. The method will generate a noise estimate and a speech signal estimate. As shown in the embodiment of the invention in FIG. 2, the input signal to the stationary noise suppression block 9 may be a preliminary processed audio signal such as any linear combination of the two audio system input signals. The linear combination may be provided by spatially filtering the two input signals using a beamformer 10, such as an adaptive beamformer system, generating the input signal to the stationary noise suppression filter 9. In another embodiment the stationary noise suppression filter may be operating on just one of the audio system input signals.

A noise suppression gain combining block 8 for combining the two intermediate noise suppression gains compares their values and dependent on the ratio or relative difference of the two values, the total noise suppression gain is determined.

To achieve the optimum noise suppression gain, the total noise suppression gain may be selected as the minimum gain or the maximum gain of the two intermediate noise suppression gains. If aggressive noise suppression is desired, the minimum gain could be selected. If conservative noise suppression is desired, letting through a larger amount of speech, the maximum gain could be selected.

Within the span of the minimum and the maximum gain a weighing factor may also be applied to achieve a more flexible total noise suppression gain. The total noise suppression gain is then selected as a linear combination of the two intermediate noise suppression gains. If the same factor 0.5 is applied to the two intermediate gains the result will be the average gain. Other factors such as 0.3 for the first intermediate gain and 0.7 for the second or vice-versa may be applied. The selected combination may be based on a measure of confidence provided by each noise reduction method.

Optionally, the noise suppression gain combining block 8 may comprise a gain refinement filter as shown in FIG. 1. The gain refinement filter 8 may filter the gain over time and frequency, e.g. to avoid too abrupt changes in noise suppression gain.

Finally, an output filtering block 11 applies the total noise suppression gain to the audio signal to generate a noise suppressed audio system output signal. Again the audio signal may be a preliminary processed audio signal such as a linear combination of the two audio system input signals provided by a beamformer 10, such as an adaptive beamformer system. The Inverse Fast Fourier Transformation (IFFT) 12 converts the output signal from the frequency domain back to the time domain to provide a processed audio system output signal.

Figure 2:
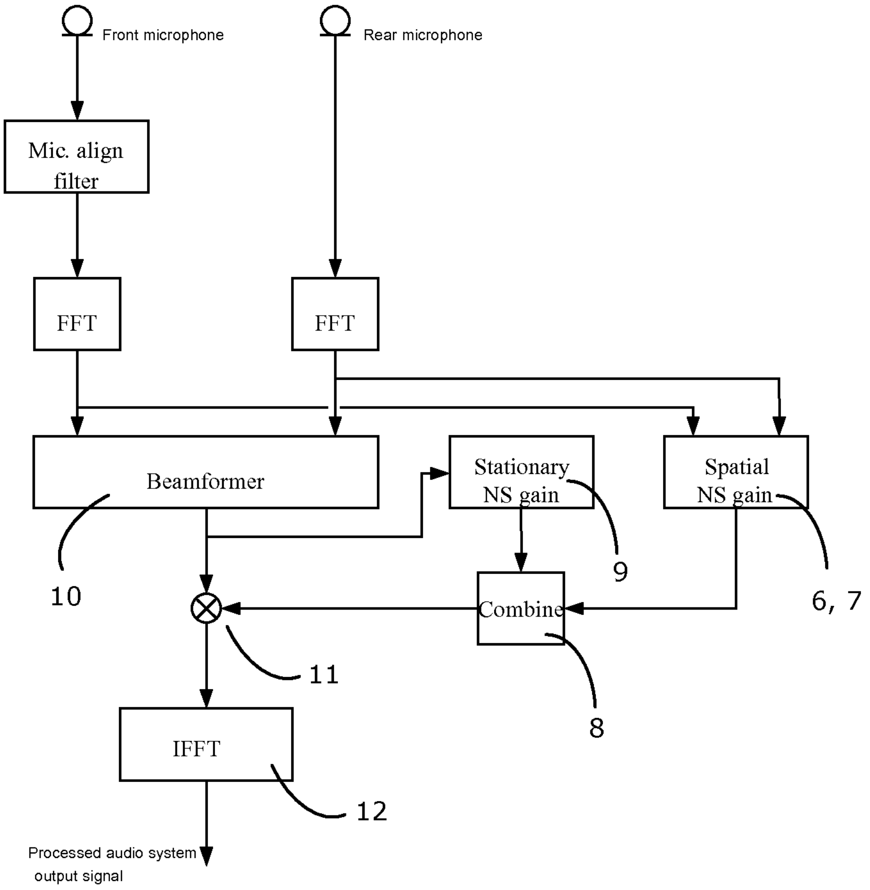
FIG. 2) depicts a second embodiment of a system for noise suppressing an audio signal according to the invention.

In the embodiment shown in FIG. 2 the output filtering block 11 applies the total noise suppression gain to the audio signal by multiplication. However, this may also be done by convolution on a time domain audio signal to generate a noise suppressed audio system output signal.

In the following, an example will explain how the spatial noise suppression gain may be computed according to the embodiments of the system shown in FIG. 1 and FIG. 2.

In the following a short hand notation is employed, where a filter bank transfer function is assumed but time and bin indices are omitted. A preliminary spatial gain is computed from a linear combination of spatial cues:

$$G_1 = \sum_{k=1}^{K} \alpha_k m_k$$

$$G_{spat} = \frac{\langle G_1^2 |Z_{ADM}|^2 \rangle}{\langle |Z_{ADM}|^2 \rangle}$$

where $m_k$, $\alpha_k$ and $Z_{ADM}$ are the spatial cues, the cue weights and the output from e.g. a beamformer, respectively. The operator <•> denotes averaging over time, e.g. 20 ms. The spatial cues and the cue weights $m_k$ and $\alpha_k$ are designed to produce a spatial gain between 0 and 1. The spatial cue weights may be applied to make one or more of the spatial cues more predominant, and vice-versa one or other spatial cues less predominant in the computation of the spatial noise suppression gain.

The proximity cue may be computed as:

$$m_1 = 1 - \beta \max\left(\left|10\log\frac{P_1}{P_2}\right| - R_0, 0\right)$$

The directional cue may be computed as:

$$m_2=1-\max(|k\angle P_{12}|-\omega_0,0)$$

where $P_1$, $P_1$ and $P_{12}$ are the auto and cross powers of the aligned input signals. Constants β, $R_0$ and $\omega_0$ parameterize the spatial cue functions. k is a frequency dependant normalization factor to map phase to angle of arrival.

Figure 3:
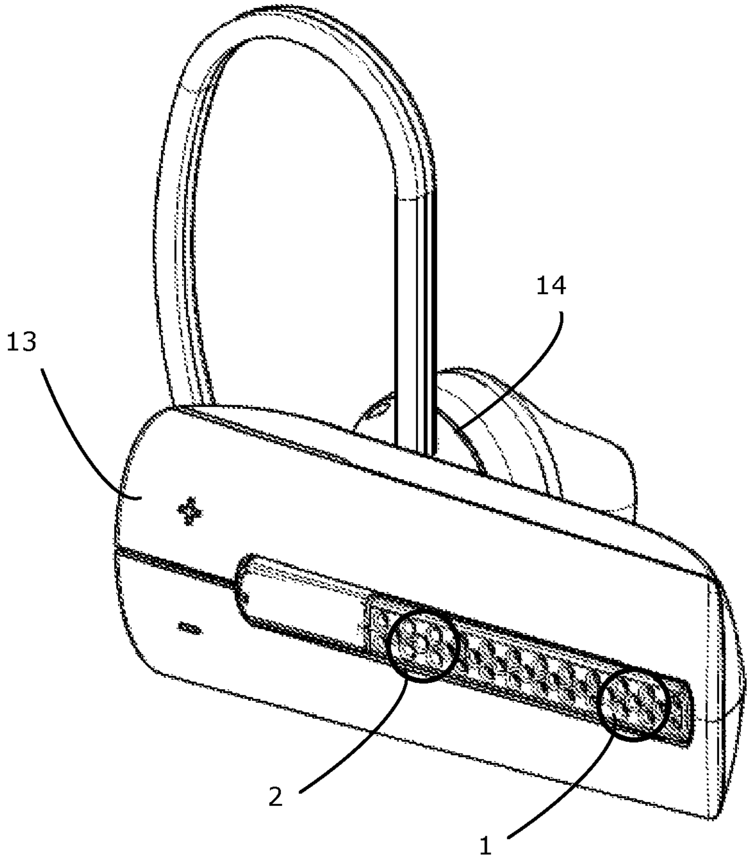
FIG. 3) depicts an embodiment of a headset comprising a system for noise suppressing an audio signal according to the invention.

Directional and non-stationary background noise is specifically targeted by the invention, but it also handles stationary noise conditions and wind noise. Advantageously the method and system according to the invention is used in a headset as described above. An embodiment of such a headset 13, having a speaker 14 and two microphones 1, 2 is shown in FIG. 3. The distance between the microphones may typically vary between 5 mm and 25 mm, depending on the dimension of the headset and on the frequency range of the processed speech signals. Narrowband speech may be processed using a relatively large distance between the microphones whereas processing of wideband speech may benefit from a shorter distance between the microphones. The method and system may with equal advantages be used for systems having more than two microphones providing more than two input signals to the audio system.

Likewise, the method and system may be implemented in other personal communication devices having two or more microphones, such as a mobile telephone, a speakerphone or a hearing aid.

The invention claimed is:

1. A method of noise suppressing an audio signal in a headset having a plurality of microphones proximate a user's mouth, comprising a combination of at least two audio system input signals each having a sound source signal portion and a background noise portion, the method comprising steps of:

a) capturing sound from a plurality of microphones, with at least a first microphone being proximate a user's mouth and a second microphone being more distant from a user's mouth than the first microphone, b) extracting at least two different types of spatial sound field features from the input signals, such as discriminative speech and/or background noise features, c) computing a first intermediate spatial noise suppression gain on the basis of the extracted spatial sound field features, d) computing a second intermediate stationary noise suppression gain, e) combining by addition, the two intermediate noise suppression gains to form a sum total noise suppression gain, wherein the two intermediate noise suppression gains are combined by comparing their values and dependent on their ratio or relative difference, determining the sum total noise suppression gain, wherein each of the intermediate noise suppression gains is non-zero;

f) applying the total noise suppression gain to the audio signal to generate a noise suppressed audio system output signal.

2. A method of noise suppressing an audio signal according to claim 1, wherein the method is carried out in the frequency domain for at least one frequency sub-band.

3. A method of noise suppressing an audio signal according to claim 1, wherein in step e), the sum total noise suppression gain is selected as a linear combination of the two intermediate noise suppression gains, such as the average gain.

4. A method of noise suppressing an audio signal according to claim 1 wherein the spatial sound field features comprise sound source proximity and/or sound signal coherence and/or sound wave directionality, such as angle of incidence.

5. A method of noise suppressing an audio signal according to claim 1, comprising prior to step f), a step of spatially filtering the audio signal by means of a beamformer, and subsequently in step f), applying the sum total noise suppression gain to the output signal from the beamformer.

6. A method of noise suppressing an audio signal according to claim 1, comprising:

computing at least one set of spatially discriminative cues derived from the extracted spatial features, and computing the spatial noise suppression gain on basis of the set(s) of spatially discriminative cues.

7. A method of noise suppressing an audio signal according to claim 6, comprising:

computing the spatial noise suppression gain from a linear combination of spatial cues.

8. A method of noise suppressing an audio signal according to claim 6, comprising:

weighing the mutual relation of the content of different types of spatial cues in the set of spatial cues as a function of time and/or frequency.

9. A method of noise suppressing an audio signal according to claim 1, comprising:

computing the stationary noise suppression gain on basis of a beamformer output signal.

10. A method of noise suppressing an audio signal according to claim 1, wherein the audio system input signals comprise at least two microphone signals.

11. A system for noise suppressing an audio signal in a headset having a plurality of microphones proximate a user's mouth, the audio signal comprising a combination of at least two audio system input signals from said microphones each having a sound source signal portion and a background noise portion, wherein the system comprises:

at least a first microphone being proximate a user's mouth and a second microphone being more distant from a user's mouth than the first microphone;

a spatial noise suppression gain block for computing a first intermediate spatial noise suppression gain, the spatial noise suppression gain block comprising spatial feature extractor for extracting at least two different types of spatial sound field features from the input signals, and a computer for computing the spatial noise suppression gain on the basis of extracted spatial sound field features, such as discriminative speech and/or background noise features, a stationary noise suppression gain block for computing a second intermediate stationary noise suppression gain, a noise suppression gain combining block for combining the two intermediate noise suppression gains by comparing their values and dependent on their ratio or relative difference, determining the sum total noise suppression gain, wherein each of the intermediate noise suppression gains is non-zero;

an output filtering block for applying the sum total noise suppression gain to the audio signal to generate a noise suppressed audio system output signal.

12. A system for noise suppressing an audio signal, according to claim 11, wherein in the sum total noise suppression gain is selected as a linear combination of the two intermediate noise suppression gains, such as the average gain.

13. A system for noise suppressing an audio signal according to claim 11, wherein the spatial sound field features comprise sound source proximity and/or sound signal coherence and/or sound wave directionality, such as angle of incidence.

14. A system for noise suppressing an audio signal according to claim 11, wherein the spatial sound field features are time and frequency dependent.

15. A system for noise suppressing an audio signal according to claim 11, further comprising an audio beamformer having the two audio system input signals as input and a spatially filtered audio signal as output, the output signal serving as input signal to the output filtering block.

16. A headset comprising at least two microphones, a loudspeaker and a noise suppression system according to claim 11, wherein the microphone signals serves as input signals to the noise suppression system.

17. A method of noise suppressing an audio signal in a headset having a plurality of microphones proximate a user's mouth, comprising a combination of at least two audio system input signals each having a sound source signal portion and a background noise portion, the method comprising steps of:

a) capturing sound from a plurality of microphones, with at least a first microphone being proximate a user's mouth and a second microphone being more distant from a user's mouth than the first microphone, the two microphones being a known distance apart, b) based on said known distance between the first and second microphones and that the sound source portion will reach the first microphone first, compensating for the time delay between the first and second microphones so that sound source portion is time-aligned between the two microphones, c) extracting at least two different types of spatial sound field features from the input signals, such as discriminative speech and/or background noise features, d) computing a first intermediate spatial noise suppression gain on the basis of the extracted spatial sound field features, e) computing a second intermediate stationary noise suppression gain, f) combining the two intermediate noise suppression gains to form a sum total noise suppression gain, wherein the two intermediate noise suppression gains are combined by comparing their values and dependent on their ratio or relative difference, determining the sum total noise suppression gain, wherein each of the intermediate noise suppression gains is non-zero;

g) applying the sum total noise suppression gain to the audio signal to generate a noise suppressed audio system output signal.

* * * * *